United States Patent [19]

Ito et al.

[11] Patent Number: 4,699,973
[45] Date of Patent: Oct. 13, 1987

[54] POLYTETRAMETHYLENEADIPAMIDE FILM

[75] Inventors: Kojiro Ito, Kusatsu; Takashi Okamoto, Osaka; Kunio Murakami, Uji; Minoru Kishida, Kyoto, all of Japan

[73] Assignee: Unitika Ltd., Hyogo, Japan

[21] Appl. No.: 858,703

[22] Filed: May 2, 1986

Related U.S. Application Data

[63] Continuation-in-part of Ser. No. 708,652, Mar. 6, 1985.

[30] Foreign Application Priority Data

Apr. 17, 1984 [JP] Japan ................................. 59-77817

[51] Int. Cl.$^4$ .............................................. C08G 69/49
[52] U.S. Cl. .................................. 528/335; 264/288.4
[58] Field of Search ...................... 528/335; 264/289

[56] References Cited

U.S. PATENT DOCUMENTS

| | | | |
|---|---|---|---|
| 3,510,552 | 5/1970 | Tsurata et al. | 528/335 |
| 4,252,966 | 2/1981 | Matsuoka et al. | 528/335 |
| 4,370,468 | 1/1983 | Nakajima et al. | 528/335 |
| 4,408,036 | 10/1983 | Gaymans et al. | 528/335 |
| 4,446,304 | 5/1984 | Gaymans et al. | 528/335 |
| 4,460,762 | 7/1984 | Gaymans et al. | 528/335 |

FOREIGN PATENT DOCUMENTS 0077106 4/1983 European Pat. Off. .

OTHER PUBLICATIONS

Telesystems Questel, Derwent No. 79-55 331B, Jun. 15, 1979.
Patent Abstracts of Japan, vol. 4, No. 95, Aug. 11, 1979, p. 117C 55.

*Primary Examiner*—Harold D. Anderson
*Attorney, Agent, or Firm*—Oblon, Fisher, Spivak, McClelland & Maier

[57] ABSTRACT

A polyamide film prepared from a polyamide composition comprised of at least 60% by weight of polytetramethyleneadipamide or a copolymer polyamide containing at least 60% by weight of a polytetramethyleneadipamide component, said film being at least monoaxially stretched at a stretching ratio of at least 1.5, said film having a characteristic value $\Delta T$ of from 30° to 60° C. as determined from the relationship:

$$\Delta T = Tm - Tc,$$

wherein Tm (melting point) is the peak melting temperature (°C.) when the temperature is increased at a rate of 20° C./min by means of a differential scanning calorimeter (DSC) and Tc (crystallization temperature) is the peak crystallization temperature (°C.) when the temperature, 20° C. above the melting point, is decreased at a rate of 80° C./min by means of a DSC, and said film having a retention rate of its breaking strength after a hydrothermal treatment at 135° C. for 30 minutes of at least 60%.

3 Claims, No Drawings

POLYTETRAMETHYLENE ADIPAMIDE FILM

CROSS-REFERENCE TO RELATED APPLICATION

This application is a continuation-in-part of application Ser. No. 708,652 filed Mar. 6, 1985.

BACKGROUND OF THE INVENTION

1. Field of the Invention:

The present invention relates to a polyamide film and to a process for its production. More particularly, the present invention relates to a process for producing a heat resistant high performance stretched polyamide film composed mainly of polytetramethyleneadipamide.

2. Description of the Background:

As regards stretched polyamide films, stretching experiments and commercial developments have been conducted mainly with respect to poly-ε-caproamide, and films having excellent oxygen impermeability, pin-hole resistance, dyeability and printing properties have been practically developed. These films have been used mainly for wrapping, particularly for freeze wrapping or liquid wrapping. However, they exhibit inferior heat resistance and hot water resistance and cannot be used at a high temperature. In particular, it is impossible to use them in high temperature retorting treatments wherein steam sterilization is conducted at a high temperature. In order to solve this problem, a stretched film using polyhexamethyleneadipamide has been developed as a polyamide film, but the heat resistance and hot water resistance are still inadequate. The problem still remains that the film undergoes degradation during the thermosetting operation after the stretching or it is likely to deteriorate during the high temperature retorting treatment. Therefore, it has been desired to further improve the heat resistance and hot water resistance.

On the other hand, a film which has excellent heat resistance and hot water resistance is a stretched polyethylene terephthalate film. However, this film has inferior oxygen impermeability, pin-hole resistance, dyeability and printing properties, and has a problem that it is susceptible to rupture during transportation.

The present inventors have conducted extensive research to solve these problems and to develop a film having excellent heat resistance and hot water resistance and yet excellent oxygen impermeability, pin-hole resistance, dyeability and printing properties. As a result, the following film and the process for its production have been invented.

SUMMARY OF THE INVENTION

An object of the present invention is to provide a polyamide film, which, besides having the outstanding properties of polyamide films, has good heat resistance and hot water resistance properties.

The present invention provides a polyamide film made of a polyamide composition containing at least 60% by weight of polytetramethyleneadipamide or a copolymer polyamide containing at least 60% by weight of a polytetramethyleneadipamide component, which is at least monoaxially stretched at a stretching ratio of at least 1.5 times and has a crystallization characteristic value $\Delta T$ of from 30° to 60° C., where $$\Delta T = Tm - Tc$$

where Tm (melting point) is a melting peak temperature (°C.) when the temperature is raised at a rate of 20° C./min by means of a differential scanning colorimeter (DSC), and Tc (crystallization temperature) is a crystallization peak temperature (°C.) when the temperature (20° C. above the melting point) is lowered at a rate of 80° C./min by means of DSC. The film has a retention rate at its breaking strength after a hydrothermal treatment at 135° C. for 30 minutes of at least 60%.

Further, the present invention provides a process for producing a polyamide film, which comprises melt-extruding from a die a polyamide composition containing at least 60% by weight of a polytetramethyleneadipamide component and cooling it at a rate of at least 105° C./sec within a temperature range of from 10° C. below the melting point to 100° C. below the melting point, to form a film, stretching the film at least monoaxially at a stretching ratio of at least 1.5 times within a temperature range of from 50° to 200° C. and thermally fixing the stretched film within a temperature range of from the stretching temperature to the melting point.

DETAILED DESCRIPTION OF THE PREFERRED EMBODIMENTS

The polyamide film of the present invention is characterized in that it is made of a polyamide composition containing at least 60% by weight of polytetramethyleneadipamide or a copolymer polyamide containing at least 60% by weight of a polytetramethyleneadipamide component, and it is at least monoaxially stretched at a stretching ratio of at least 1.5 times, wherein the difference between the melting point and the crystallization temperature in a temperature lowering operation at a rate of 80° C./min is within a range of from 30° to 60° C.

Polytetramethyleneadipamide is a resin having a melting point of 292° C. and excellent heat resistance. However, its crystallization speed is so high that the crystallization proceeds under a usual film-forming cooling speed and it is thereby impossible to stretch it uniformly. It is possible to lower the crystallization speed and control the crystallization by blending or copolymerizing it with other polyamide components such as ε-caprolactam, hexamethyleneadipamide, hexamethyleneterephthalamide or paraphenyleneterephthalamide. However, if the proportion of the tetramethyleneadipamide component is reduced too much, the heat resistance will be impaired. Accordingly, the tetramethyleneadipamide component is required to be at least 60% by weight, preferably at least 80% by weight.

Further, the molecular weight of the resin gives a substantial effect to the crystallization. If the molecular weight is too small, the crystallization speed tends to be high, whereby it becomes difficult to conduct uniform stretching after the film-forming operation.

As an index for the crystallization speed, it is common to employ a difference between the melting point and the crystallization temperature, i.e., the temperature difference between the molten state and the recrystallizing state. The greater the temperature difference, the slower the crystallization speed and the more difficult the crystallization process. There is a tendency that the greater the temperature lowering rate from the melting point is, the greater the crystallization temperature will be, and the smaller the difference between the melting point and the crystallization temperature.

Therefore, when this index is to be used, the temperature lowering rate must be fixed.

The present inventors have fixed the temperature lowering rate from the molten state at a level of 80° C./min, and have conducted experiments to determine the difference between the melting point and the crystallization temperature by means of a differential scanning calorimeter (DSC). As a result, it has been found that the stretching can satisfactorily be conducted and a uniformly stretched film can be obtained in the case where the temperature difference is at least 30° C., preferably at least 35° C., at most 60° C., preferably at most 55° C. If the temperature difference is less than 30° C., the crystallization proceeds too much, whereby it becomes difficult to conduct the stretching uniformly, or to obtain a film having uniform physical properties. On the other hand, if the temperature difference exceeds 60° C., the crystallization tends to be too low, whereby the heat resistance will be inadequate.

The melting point is a melting peak temperature when the temperature is raised at a rate of 20° C./min by means of DSC, and the crystallization temperature is a crystallization peak temperature when the temperature at a level of 20° C. above the melting point is lowered at a rate of 80° C./min.

In order to prevent crystallization during the film-forming operation, it is necessary to cool the resin extruded from the die.

In the case of a polyamide containing at least 60% by weight of polytetramethyleneadipamide, it is possible to prevent the crystallization by forming a film at a cooling rate of at lest 105° C./sec, preferably at least 120° C./sec within a temperature range of from 10° C. below the melting point to 100° C. below the melting point, whereby it will be possible to conduct the stretching uniformly after the film-forming operation. The stretching temperature is from 50 to 220° C., preferably from 70°to 170° C., as will be discussed with respect to the comparative examples. If the temperature is outside the above range, problems such as neck stretching, stretch-breakage and whitening are likely to result, and it becomes difficult to obtain a uniform film. In order to improve the mechanical properties and thermal properties, the stretching ratio should be at least 1.5 times at least monoaxially. It is preferred to biaxially stretch the film at a stretching ratio of at least 2 times. The stretching method is not critical and may be a roll stretching method, a tubular stretching method or a tenter stretching method. However, the most satisfactory results are obtained by the simultaneous biaxial stretching method. This is attributable to the fact that while in the case of a successive biaxial stretching method, the hydrogen bonds between the polyamide molecular chains formed by the monoaxial stretching hinders uniform stretching in the subsequent stretching operation, such hinderance can be avoided in the case of the simultaneous biaxial stretching method.

The stretched film is required to have heat resistant dimensional stability, and it is necessary to thermally fix it within a temperature range from the stretching temperature to the melting point, preferably from 200° to 250° C. Polytetramethyleneadipamide is usually prepared by the polycondensation of tetramethyleneadiamine with adipic acid and is a compound having a repeating unit of [NH—(CH$_2$)$_4$—NH—CO—(CH$_2$)$_4$—CO]. However, the process for its production is not critical. It is usual to employ a method wherein a salt of tetramethylenediamine and adipic acid are heated to a temperature of about 200° C. to obtain a prepolymer, and the prepolymer is pulverized and heated under steam to promote solid phase polymerization. In the case where a copolymer is to be prepared, the other component is added at the stage of the preparation of the prepolymer, and it is preferred to add ε-caprolactam as such a component in view of cost considerations and the thermal stability of the product. Further, in the case where the polytetramethyleneadipamide is blended with another polyamide, it is preferred to employ a melt blending method by means of a single-screw or twin-screw extruder. Further, it is needless to say that a lubricant may be added to improve the lubricating property, and a thermal stabilizer may be added to improve the thermal stability.

The film produced by the present invention has particularly excellent heat resistance, and is useful for high temperature retort food wrapping, electric wire wrapping, and for other heat resistant packaging.

Having generally described this invention, a further understanding can be obtained by reference to certain specific examples which are provided herein for purposes of illustration only and are not intended to be limiting unless otherwise specified.

COMPARATIVE EXAMPLES 1 TO 14 AND EXAMPLES 1 TO 8

A salt of tetramethylenediamine and adipic acid were heated under pressure at 180° C. for about 1.5 hours to obtain a prepolymer. This prepolymer was pulverized and subjected to solid phase polymerization under heating in a steam atmosphere of 260° C. for different hourly time periods to obtain three kinds of polytetramethyleneadipamide resins. Each of these resins was heated to 300° C. in a 45 mm extruder and extruded from a T-die and cooled at various cooling rates to obtain non-stretched films having a thickness of 150 μm. The non-stretched films were stretched lengthwise at a stretching ratio of 1.5 times by means of a roll heating-type lengthwise stretcher. The stretchability of the films was compared, and the results are shown in Table 1.

TABLE 1

| | | ΔT* (°C.) | Cooling rate (°C./sec) | Stretching temp. (°C.) | Stretched state | Evaluation |
|---|---|---|---|---|---|---|
| Compara- | 1 | 27 | 81 | 100 | Broken | Bad |
| tive | 2 | 27 | 81 | 150 | " | " |
| Example | 3 | 27 | 81 | 190 | " | " |
| | 4 | 27 | 111 | 100 | " | " |
| | 5 | 27 | 111 | 150 | Necking formed | " |
| | 6 | 27 | 111 | 210 | Necking formed | " |
| | 7 | 27 | 132 | 170 | Necking formed | " |
| | 8 | 27 | 132 | 220 | Necking formed | " |

TABLE 1-continued

|  |  | ΔT* (°C.) | Cooling rate (°C./sec) | Stretching temp. (°C.) | Stretched state | Evaluation |
|---|---|---|---|---|---|---|
|  | 9 | 35 | 81 | 100 | Broken | " |
|  | 10 | 35 | 81 | 150 | Necking formed | " |
|  | 11 | 35 | 81 | 190 | Necking formed | " |
| Example | 1 | 35 | 111 | 100 | Properly stretched | Good |
|  | 2 | 35 | 111 | 150 | Properly stretched | " |
|  | 3 | 35 | 120 | 70 | Properly stretched | " |
|  | 4 | 35 | 120 | 100 | Properly stretched | " |
| Comparative Example | 12 | 48 | 81 | 150 | Necking formed | Bad |
|  | 13 | 48 | 81 | 190 | Necking formed | " |
| Example | 5 | 48 | 111 | 150 | Properly stretched | Good |
|  | 6 | 48 | 111 | 190 | Properly stretched | " |
|  | 7 | 48 | 120 | 70 | Properly stretched | " |
|  | 8 | 48 | 120 | 130 | Properly stretched | " |
| Comparative Example | 14 | 48 | 120 | 230 | Whitening | Bad |

*ΔT = Tm − Tc where Tm is the melting point and Tc is the crystallization temperature as defined above.

EXAMPLES 9 TO 14

ε-Caprolactam was added to a salt of tetramethylenediamine and adipic acid, and copolymer polyamide resins were prepared in the same way as in Examples 1 to 8. Each of these resins was extruded from the T-die in a similar manner, and cooled at a rate of 125° C./sec to obtian a non-stretched film having a thickness of 150 μm. The non-stretched film was biaxially stretched at a stretching ratio of 3 times in each of the lengthwise and transverse directions by means of a tenter-system simultaneous biaxial stretching method, and thermally fixed at a temperature of 240° C.

The stretching results were shown in Table 2. Various properties of the stretched film of Example 10 were measured, whereby good results as shown in Table 3 were obtained.

TABLE 2

|  |  | ε-Caprolactam (wt. %) | ΔT (°C.) | Stretching temp. (C.) | Stretched state |
|---|---|---|---|---|---|
| Example | 9 | 5 | 43 | 70 | Good |
|  | 10 |  |  | 100 | Good |
|  | 11 |  |  | 130 | Good |
|  | 12 | 15 | 48 | 70 | Good |
|  | 13 |  |  | 100 | Good |
|  | 14 |  |  | 130 | Good |

Further, the physical properties after the hydrothermal treatment at 135° C. for 30 minutes of the stretched films of Example 9–14 were measured. Very good results were obtained, as shown in Table 5, and the retention rates at the indicated breaking strengths are greater than 60%. The measurements were conducted in accordance with the procedure of ASTM D882-67.

TABLE 3

| Items | Units | Directions MD | TD |
|---|---|---|---|
| Breaking strength | kg/mm² | 25 | 24 |
| Breaking elongation | % | 50 | 43 |

TABLE 3-continued

| Items | Units | Directions MD | TD |
|---|---|---|---|
| Young's modulus | kg/mm² | 180 | 185 |
| Thermal shrinkage (160° C. × 15 min) | % | 0.15 | 0.24 |
| Oxygen permeability (MOCON method: 20° C. 100% RH) | cc/m³ · 24 hr | 107 |  |
| Properties after hydrothermal treatment at 130° C. for 30 min. |  |  |  |
| Breaking strength | kg/mm² | 22 | 22 |
| Breaking elongation | % | 44 | 39 |
| Young's modulus | kg/mm² | 153 | 159 |

Note:
MD: Machine direction (i.e. lengthwise direction)
TD: Transverse direction

EXAMPLES 15 TO 18

The same polytetramethyleneadipamide resin as used in Example 1 and a poly-ε-caproamide resin were mixed at various mixing ratios and heated to 300° C. in a 45 mm extruder, and formed into films under the same conditions as described in Example 1, whereby non-stretched films having a thickness of 150 μm were obtained. Each of these non-stretched films was biaxially stretched at a stretching ratio of 3 times in each of the lengthwise and transverse directions by means of a tenter-system, simultaneous biaxial stretching method, and thermally fixed at 220° C.

The stretched state was good in each case, and no necking was observed. The physical properties of the stretched films are as shown in Table 4.

TABLE 4

| | Amount of polytetra-methyleneadipamide (% by weight) | Breaking strength (kg/mm²) MD | Breaking strength (kg/mm²) TD | Breaking elongation (%) MD | Breaking elongation (%) TD |
|---|---|---|---|---|---|
| Example 15 | 90 | 30 | 29 | 67 | 72 |
| Example 16 | 80 | 28 | 29 | 61 | 65 |
| Example 17 | 70 | 28 | 28 | 59 | 60 |
| Example 18 | 60 | 26 | 25 | 68 | 70 |

The physical properties of the stretched films of Examples 15–18 after the hydrothermal treatment at 135° C. for 30 minutes were measured. Very good results were obtained as shown in Table 5, and the retention rates at the indicated breaking strengths are greater than 60%. The measurements were conducted in accordance with the procedure of ASTM D882-67.

TABLE 5

| | Direction | Before hydrothermal treatment Breaking strength kg/mm² | Before hydrothermal treatment Breaking elongation % | After hydrothermal treatment Breaking strength kg/mm² | After hydrothermal treatment Retention rate % | After hydrothermal treatment Breaking elongation % | After hydrothermal treatment Retention rate % |
|---|---|---|---|---|---|---|---|
| Example 9 | MD | 26 | 55 | 21 | 81 | 56 | 102 |
| | TD | 26 | 52 | 20 | 77 | 55 | 106 |
| Example 10 | MD | 25 | 50 | 20 | 80 | 50 | 100 |
| | TD | 24 | 43 | 19 | 79 | 47 | 109 |
| Example 11 | MD | 25 | 49 | 19 | 76 | 48 | 98 |
| | TD | 25 | 52 | 19 | 76 | 50 | 96 |
| Example 12 | MD | 23 | 75 | 15 | 65 | 60 | 80 |
| | TD | 23 | 72 | 16 | 70 | 65 | 90 |
| Example 13 | MD | 23 | 77 | 17 | 74 | 75 | 97 |
| | TD | 22 | 70 | 16 | 73 | 65 | 93 |
| Example 14 | MD | 23 | 78 | 17 | 74 | 69 | 88 |
| | TD | 23 | 77 | 17 | 74 | 67 | 87 |
| Example 15 | MD | 30 | 67 | 24 | 80 | 66 | 99 |
| | TD | 29 | 72 | 25 | 86 | 68 | 94 |
| Example 16 | MD | 28 | 61 | 22 | 79 | 57 | 93 |
| | TD | 29 | 65 | 22 | 76 | 57 | 88 |
| Example 17 | MD | 28 | 59 | 18 | 64 | 52 | 88 |
| | TD | 28 | 60 | 18 | 64 | 54 | 90 |
| Example 18 | MD | 26 | 68 | 17 | 65 | 63 | 93 |
| | TD | 25 | 70 | 16 | 64 | 66 | 94 |

COMPARATIVE EXAMPLE 15

Poly-ε-caproamide resin was heated to 240° C. in a 45 mm extruder and extruded from a T-die to obtain a non-stretched film having a thickness of 150 m. The non-stretched film was biaxially stretched at 120° C. and at a stretching ratio of 3 times in each of the lengthwise and transverse directions in the same manner as in Example 9, and thermally fixed at a temperature of 200° C.

The physical properties after the hydrothermal treatment at 135° C. for 30 minutes of the stretched film was measured in the same manner as described in Example 9. The results thereby obtained are shown in Table 6 from which it is clear that the properties of the film had substantially deteriorated.

COMPARATIVE EXAMPLE 16

Polyhexamethyleneadipamide resin was heated at 280° C. in a 45 mm extruder and was extruded from a T-die to obtain a non-stretched film having a thickness of 150 m. The non-stretched film was biaxially stretched at 100° C. and at a stretching ratio of 3 times in each of the lengthwise and transverse directions in the same manner as described in Example 9, and thermally fixed at a temperature of 230° C.

The physical properties after the hydrothermal treatment at 135° C. for 30 minutes of the stretched film were measured in the same manner as described in Example 9. The results thereby obtained are shown in Table 6 from which it is clear that the properties of the film had substantially deteriorated.

TABLE 6

| | Resins | Direction | Before hydrothermal treatment Breaking strength kg/mm² | Before hydrothermal treatment Breaking elongation % | After hydrothermal treatment Breaking strength kg/mm² | After hydrothermal treatment Retention rate % | After hydrothermal treatment Breaking elongation % | After hydrothermal treatment Retention rate % |
|---|---|---|---|---|---|---|---|---|
| Comparative Example 15 | Poly-ε-caproamide | MD | 24 | 85 | 9 | 38 | 75 | 88 |
| | | TD | 24 | 83 | 8 | 33 | 70 | 84 |
| Comparative Example 16 | Polyhexamethylene-adipamide | MD | 28 | 95 | 15 | 54 | 97 | 102 |
| | | TD | 27 | 90 | 15 | 56 | 91 | 101 |

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A polyamide film prepared from a polyamide composition comprised of at least 60% by wt. of polytetramethyleneadipamide or a copolymer polyamide containing at least 60% by weight of a polytetramethyleneadipamide component, said film being at least monoaxially stretched at a stretching ratio of at least 1.5, said film having a characteristic crystallization value $\Delta T$ of from 30° to 60° C. as determined from the relationship: $\Delta T = Tm - Tc$, wherein Tm (melting point) is the peak melting temperature (°C.) when the temperature is increased at a rate of 20° C./min by means of a differential scanning calorimeter (DSC) and Tc (crystallization temperature) is the peak crystallization temperature (°C.) when the temperature, 20° C. above the melting point, is decreased at a rate of 80° C./min by means of a DSC, and said film having a retention rate at its breaking strength after a hydrothermal treatment at 135° C. for 30 minutes of at least 60%.

2. The polyamide film of claim 1, wherein said film is biaxially stretched at a stretching ratio of at least 2.

3. The polyamide film of claim 1, wherein the tetramethyleneadipamide component of said polyamide composition is present in an amount of at least 80% by weight.

* * * * *